United States Patent
Huibers et al.

(10) Patent No.: US 6,950,223 B2
(45) Date of Patent: Sep. 27, 2005

(54) MULTIPLE HINGE MEMS DEVICE

(75) Inventors: Andrew G. Huibers, Palo Alto, CA (US); Satyadev R. Patel, Elk Grove, CA (US)

(73) Assignee: Reflectivity, Inc, Sunnyvale, CA (US)

( * ) Notice: Subject to any disclaimer, the term of this patent is extended or adjusted under 35 U.S.C. 154(b) by 262 days.

(21) Appl. No.: 10/346,506

(22) Filed: Jan. 15, 2003

(65) Prior Publication Data

US 2004/0233505 A1 Nov. 25, 2004

(51) Int. Cl.⁷ .................. G02B 26/00; G02B 26/08; G02B 5/08; H01L 29/84
(52) U.S. Cl. ............. 359/291; 359/290; 359/214; 359/224; 359/298; 359/850; 257/417; 310/36; 310/90; 310/309
(58) Field of Search ................... 359/290, 291, 359/298, 214, 223, 224, 850, 196, 198; 257/417; 310/36, 90, 309, 328

(56) References Cited

U.S. PATENT DOCUMENTS

| | | | | |
|---|---|---|---|---|
| 3,490,056 A | * | 1/1970 | Milton et al. | 333/186 |
| 4,421,381 A | * | 12/1983 | Ueda et al. | 359/214 |
| 5,629,794 A | * | 5/1997 | Magel et al. | 359/290 |
| 5,661,591 A | * | 8/1997 | Lin et al. | 359/290 |
| 5,739,941 A | | 4/1998 | Knipe et al. | 359/224 |
| 5,808,780 A | | 9/1998 | McDonald | 359/290 |
| 5,835,256 A | * | 11/1998 | Huibers | 359/291 |
| 5,917,647 A | * | 6/1999 | Yoon | 359/298 |
| 6,046,840 A | * | 4/2000 | Huibers | 359/291 |
| 6,172,797 B1 | * | 1/2001 | Huibers | 359/291 |
| 6,220,561 B1 | * | 4/2001 | Garcia | 248/487 |
| 6,275,326 B1 | * | 8/2001 | Bhalla et al. | 359/298 |
| 6,356,378 B1 | * | 3/2002 | Huibers | 359/291 |
| 6,741,383 B2 | * | 5/2004 | Huibers et al. | 359/291 |
| 6,876,485 B1 | * | 4/2005 | Dunphy | 359/291 |

* cited by examiner

*Primary Examiner*—Loha Ben
(74) *Attorney, Agent, or Firm*—Gregory R. Muir

(57) ABSTRACT

A MEMS device is disclosed comprising: a substrate; a movable micromechanical element movable relative to the substrate; a connector and a hinge for allowing movement of the micromechanical element, wherein the connector is made of a material different than the hinge. In another embodiment of the invention, the connector has a conductivity greater than the hinge. In a further embodiment of the invention, the hinge provides at least 90% of the restoring force to the MEMS device, and the connector provides 10% or less of the restoring force. In a further embodiment of the invention, the connector and the hinge have different spring constants. In a still further embodiment of the invention, the connector experiences a lower strain at maximum deflection of the micromechanical element than the hinge.

98 Claims, 4 Drawing Sheets

MULTIPLE HINGE MEMS DEVICE

BACKGROUND OF THE INVENTION

The present invention is related to MEMS devices and in particular to hinges and electrical connections for MEMS devices. More particularly, the invention is related to hinge and electrical connection shapes, characteristics and/or materials for MEMS device, in particular micromirror or other electrostatically deflectable micromechanical elements.

There are many MEMS devices in which a movable element is connected to a rigid substrate through flexible hinges. These hinges allow the movable element to move. The most commonly used MEMS materials are single crystal silicon, polysilicon, and silicon nitr. All of these are good MEMS materials because they deform nearly perfectly elastically, and also the first two conduct electricity, which enables a variety of electrostatic actuators, fabricated for example in the MUMPS or SUMMIT processes.

These materials do not solve all MEMS device requirements however, because they are difficult to fabricate. Single crystal silicon must be cut out of a wafer. Polysilicon requires high temperature deposition, and silicon nitride does not conduct. A high deposition temperature step is undesirable because it can disturb other films deposited at lower temperatures, e.g. aluminum. Silicon nitride does not conduct and thus is not sufficient alone.

A common approach in MEMS devices is to use an insulating mechanical layer in a laminate with an additional metal layer provided to conduct electricity. However, metallic layers often do not deform elastically once their rather low strain limits are exceeded. As a result, fatigue, fracture and creep sometimes results after repeated actuation.

What are needed are novel materials and designs for MEMS devices that allow for electrical conductivity to a MEMS movable element as well as elastic deformation of such a movable element without fatigue or other damage modes.

SUMMARY OF THE INVENTION

A MEMS device is disclosed comprising: a substrate; a movable micromechanical element movable relative to the substrate; a connector and a hinge for allowing movement of the micromechanical element, wherein the connector is made of a material different than the hinge.

In another embodiment of the invention, a MEMS device comprises: a substrate; a movable micromechanical element movable relative to the substrate; a connector and a hinge for allowing movement of the micromechanical element, wherein the connector has a conductivity greater than the hinge.

In a further embodiment of the invention, a MEMS device comprises: a substrate; a movable micromechanical element movable relative to the substrate; a hinge and a connector separate from the hinge, wherein the hinge provides at least 90% of the restoring force to the MEMS device, and the connector provides 10% or less of the restoring force.

In a further embodiment of the invention, a MEMS device comprises: a substrate; a movable micromechanical element movable relative to the substrate; a hinge and a connector separate from the hinge, wherein the connector and the hinge have different spring constants.

In a still further embodiment of the invention, a MEMS device comprises: a substrate; a movable micromechanical element movable relative to the substrate; a connector and a hinge for allowing movement of the micromechanical element, wherein the connector experiences a lower strain at maximum deflection of the micromechanical element than the hinge.

And in another embodiment of the invention, a MEMS device comprises: a substrate; a movable micromechanical element movable relative to the substrate; a connector and a hinge for allowing movement of the micromechanical element, each hinge being an elongated hinge that connects to one or more posts on the substrate and to the movable micromechanical element, each hinge having a length in the direction of the elongation, and a width and depth; wherein at least one of the width and depth of the connector is different than the width or depth of the hinge.

In a preferred embodiment the MEMS device is a micromirror. Also encompassed within the invention are projection systems using the various MEMS devices of the invention. Such projection systems can comprise a light source for providing a light beam; a white light color divider for dividing white light temporally or spatially into different color light beams; a micromirror array comprising the MEMS device of the invention that is provided in a path of the different color light beams; and optics for projecting and/or focusing light reflected from the micromirror array.

DESCRIPTION OF THE PREFERRED EMBODIMENTS

Figure 1:
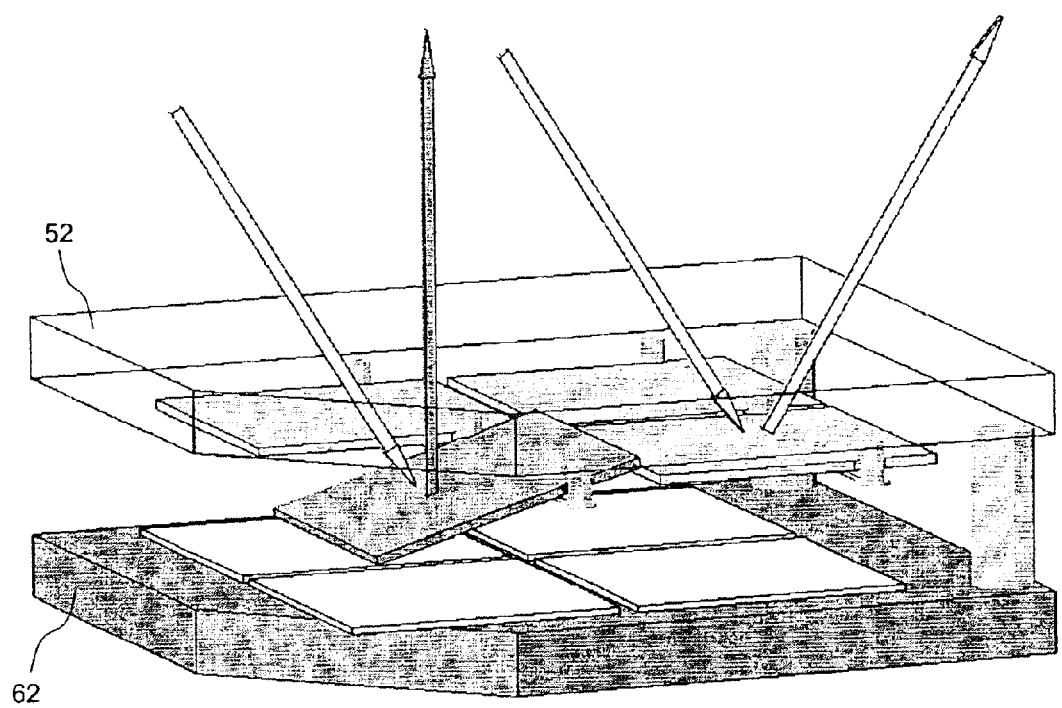
FIG. 1 is an illustration of four mirrors from a micromirror array, with one mirror deflected.

The present invention relates to micro-mechanical devices and more particularly to systems for physically and electrically connecting micro-mechanical devices to each other and/or a substrate on which they are formed. The micro-mechanical device can be any movable device that is held by one or more hinges on a substrate. As one example, as can be seen in FIG. 1, micromirrors are held on light transmissive substrate 52 and are actuated by electrodes on a semiconductor substrate 62. General methods for making micromirrors are disclosed in U.S. Pat. No. 5,835,256 issued Nov. 10, 1998 and U.S. Pat. No. 6,172,797 issued Jan. 9, 2001, both to Huibers et al. and incorporated herein by reference. Other methods for making micromirrors are disclosed in U.S. patent application Ser. No. 10/005,308 to Patel et al. filed Dec. 3, 2001, U.S. patent application Ser. No. 60/276,222 to Patel et al. filed Mar. 15, 2001, U.S. patent application Ser. No. 09/649,569 to Patel et al. filed Aug. 28, 2000, U.S. patent application Ser. No. 60/298,529 to Reid et al. filed Jun. 15, 2001, and U.S. Pat. No. 6,290,865 to Patel et al. issued Sep. 18, 2001, each of these being incorporated herein by reference. In addition, the invention is related to micromirrors for optical switching, such as disclosed in U.S. Pat. No. 6,337,760 to Huibers et al. issued Jan. 8, 2002, incorporated herein by reference. Also, the separate hinge and electrical connections for a MEMS device are disclosed in related U.S. patent application Ser. No. 09/977,603 to Huibers filed Oct. 12, 2001(now abandoned), also incorporated herein by reference.

As can be seen in FIG. 1, four micromirrors are held on a substrate preferably transmissive to visible light (e.g. glass or quartz). A second substrate 62, preferably a silicon substrate, comprises circuitry and electrodes for electrostatically actuating the micromirrors on substrate 52. The micromirrors are microfabricated separately on substrate 52 and circuitry and electrodes are microfabricated separately on device substrate 62, followed by bonding of the two substrates together. Such microfabrication and bonding is disclosed in further detail in the above-mentioned patents and patent applications.

Figure 2A:
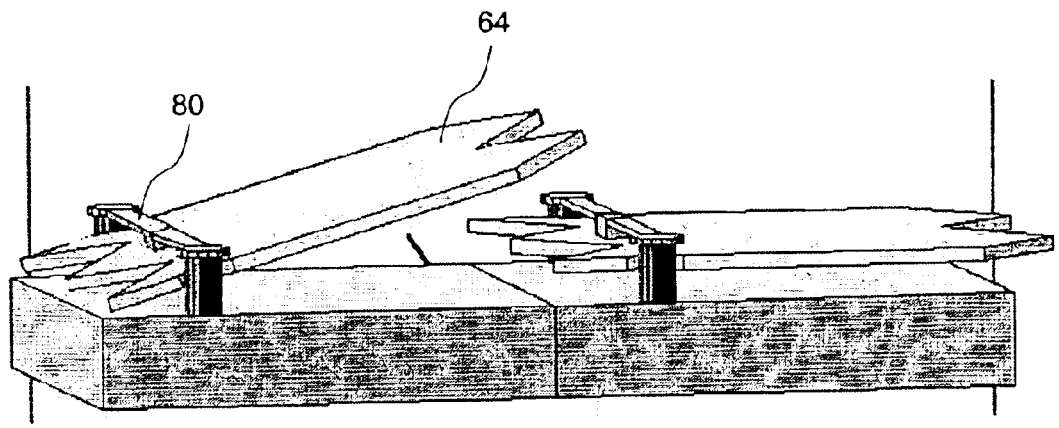
FIGS. 2A and 2B show a micromirror held on a substrate in a deflected state via hinges and posts.
Figure 2B:
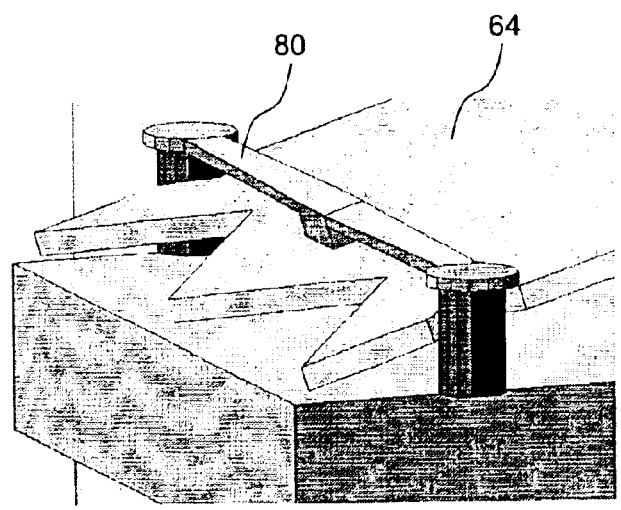

In FIGS. 2A and 2B, a torsion hinge 80 is shown connecting the mirror 64 to a transparent substrate. In this device the torsion hinge comprises a conducting component, e.g. it is made of a conducting material or a laminate containing a conductive material. As such, the hinge 80, whether a single material or a laminate, is used to both pivotably hold the mirror on the substrate as well as maintain an electrical connection with the substrate and/or other mirrors.

Figure 3:
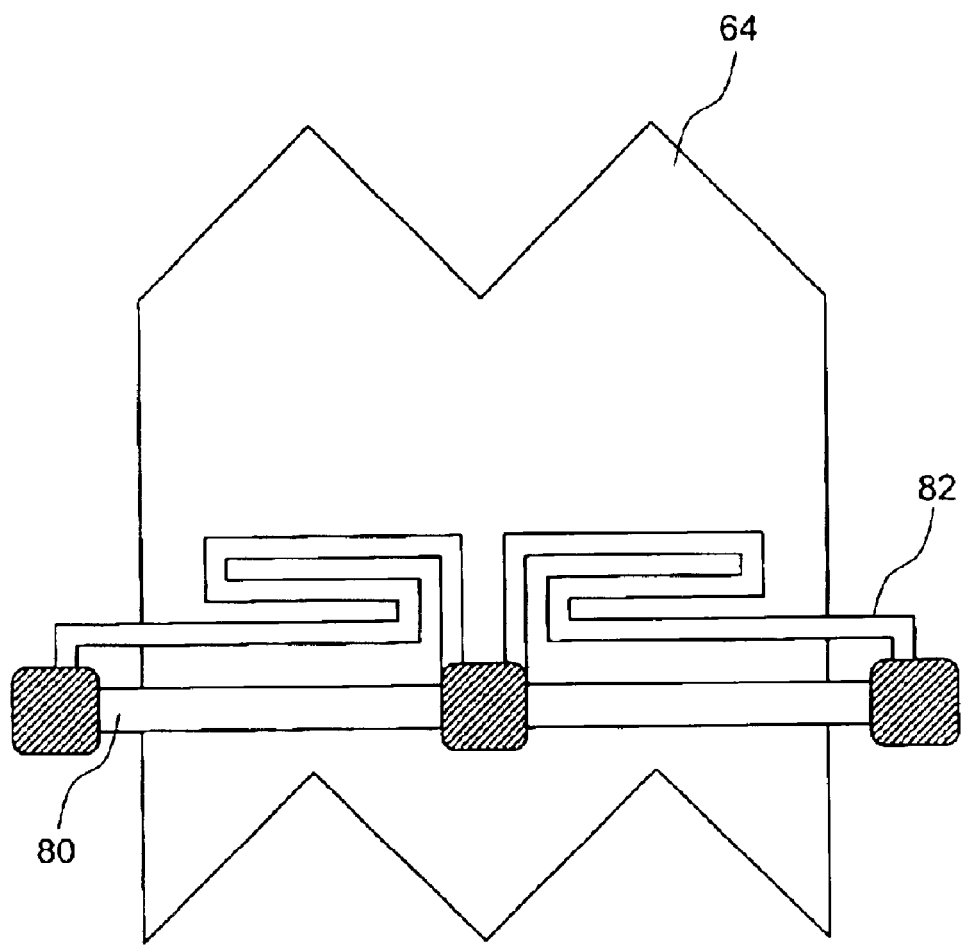
FIG. 3 shows a top view of an embodiment of a micromirror with two hinges.
Figure 4:
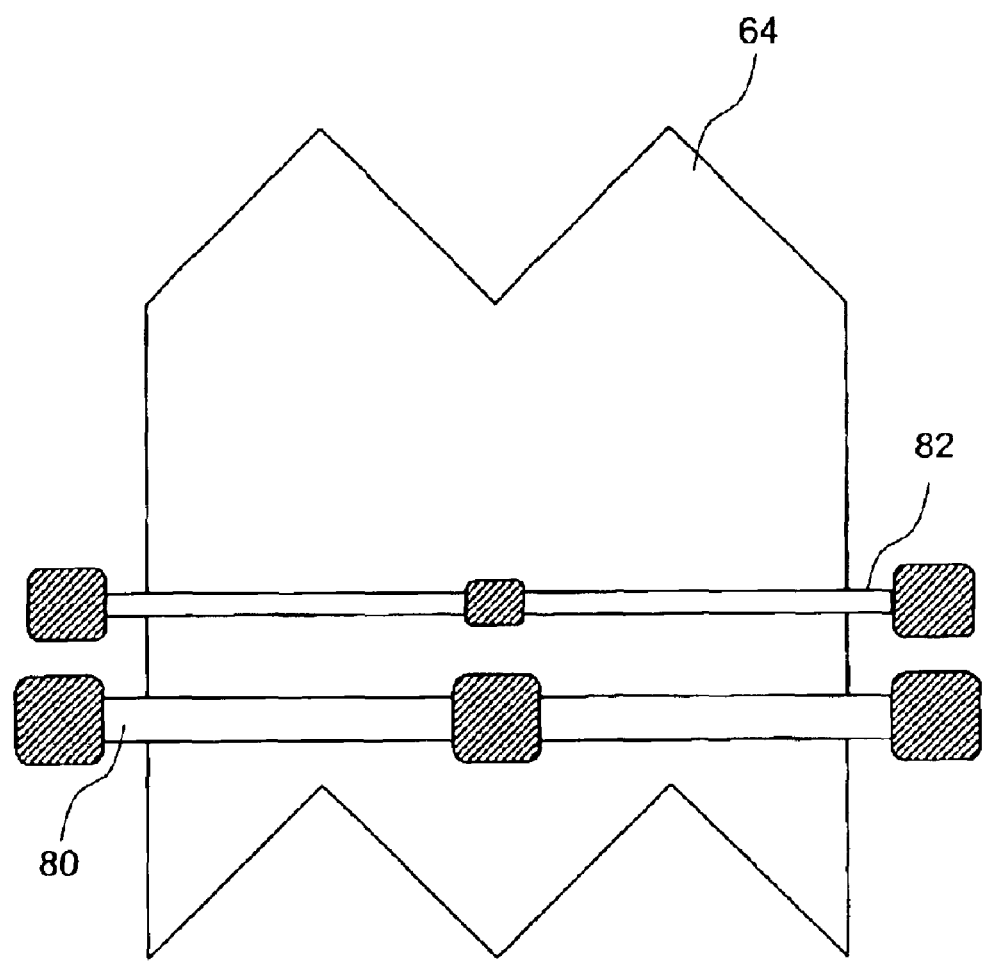
FIG. 4 shows an alternate embodiment of a micromirror with two hinges.

In one example of the present invention, as can be seen in FIG. 3, a connection 82 is used for electrically connecting to micromechanical (micromirror) element 64 that is separate from hinge 80. In this way, materials can be selected and optimized to have the best strength, elasticity, and freedom from fatigue for the hinge, and different materials can be selected and optimized for electrical conductivity for the electrical connection 82. The spring stiffness can thus be different for the hinge 80 and the electrical connection 82—preferably where the hinge is stiffer than the electrical connection. In many types of MEMS actuators a hinge attaches a movable element to a substrate. Part of the movable element then moves towards the substrate and touches it or touches some other limit. At this point it is desirable that the movable element does not move further. This requirement often results in the engineering situation that one wants to make hinges short or in tension, and not meandering. The design of FIG. 3 is a way to get the best of both worlds—a shorter more elastic hinge doing the mechanical work, and a lightly strained hinge to carry the electrical charge. The hinge and electrical connection can be provided separately connected to the substrate and micromirror plate, as can be seen in FIG. 4.

The electrical connection 82 can be any suitable shape, though thin and or circuitous designs are preferred. Also, the electrical connection 82 can be formed in the same plane or in a different plane, depending upon the exact deposition method. CVD (chemical vapor deposition) and PVD (physical vapor deposition) processes can be used for depositing the hinge and electrical connection materials as known in the art and as set forth in the above noted patents and applications. In a preferred embodiment, the electrical connection is deposited by sputtering/PVD, and the hinge is deposited by sputtering or CVD. Also, in a preferred embodiment, the electrical connection is a metal (e.g. Al, Ti, etc.), intermetallic compound (e.g. TiAl, TiW, etc.), conductive ceramic (e.g. TiN, WC, RuO, TiO, etc.) or metal alloy (such as alloys of aluminum, titanium, tungsten, tungsten, copper, etc.) or a conductive alloy of a metal and a dielectric compound (such as cobalt silicon nitride, platinum silicon oxide, etc.) such as the compounds set forth in U.S. patent application Ser. Nos. 09/910,537 filed Jul. 20, 2001 and 60/300,533 filed Jun. 22, 2001, each incorporated herein by reference. The hinge can be electrically conductive or a semiconductor, though in a preferred embodiment, the hinge is an insulating ceramic. By "ceramic" it is meant a compound where a metal (or metalloid) is bound to a non-metal. Preferred are oxide, nitride and carbide compounds of metalloids and early transition metals. Particularly preferred are nitrides and oxides or titanium and silicon, such as silicon nitride, silicon oxynitride, silicon oxide, titanium oxide, titanium nitride and titanium oxynitride. The ceramic can be either insulating (such as the silicon nitride) or conductive (such as titanium nitride). Other hinge materials and methods for deposition are set forth in the above noted patents and applications.

While the invention has been described in conjunction with specific embodiments, it is evident to those skilled in the art that many alternatives, modifications, and variations will be apparent in light of the foregoing description. Accordingly, the invention is intended to embrace all such alternatives, modifications, and variations that fall within the spirit and scope of the appended claims.

What is claimed is:

1. A MEMS device comprising:
   a substrate;
   a movable micromechanical element movable relative to the substrate;
   a hinge held on the substrate and connected to the movable micromechanical element for allowing movement of the micromechanical element, and a connector separate from the hinge for allowing electrical connection to the movable micromechanical element, wherein the hinge is made of a material different than the connector.

2. The MEMS device of claim 1, wherein the spring constant of the connector is different than the spring constant of the hinge.

3. The MEMS device of claim 2, wherein the hinge that is stiffer is insulating and the connector that is less stiff is conducting.

4. The MEMS device of claim 2, wherein the difference in the spring constants of the hinge and connector is by at least a factor of one.

5. The MEMS device of claim 3, wherein the hinge comprises a ceramic material.

6. The MEMS device of claim 5, wherein the hinge comprises a nitride or oxide of silicon.

7. The MEMS device of claim 6, wherein the connector comprises an elemental metal, conductive intermetallic compound, or a metal alloy.

8. The MEMS device of claim 7, wherein the connector comprises aluminum, titanium, titanium nitride, titanium tungsten, titanium aluminide, tungsten, copper, and mixtures thereof.

9. The MEMS device of claim 1, wherein the connector comprises a metal, intermetallic compound, conductive ceramic or metal alloy layer and the hinge comprises an insulating ceramic compound layer.

10. The MEMS device of claim 9, wherein the connector is made of aluminum, titanium, titanium tungsten, titanium nitride, titanium aluminide, tungsten, copper, and alloys; thereof, and the hinge comprises a metal oxide, metalloid oxide, metalloid nitride or metal nitride.

11. The MEMS device of claim 1, wherein the hinge supplies at least 99% of the restoring force to the micromechanical element and the connector supplies 1% of less or the restoring force.

12. The MEMS device of claim 1, wherein a plurality hinges and connectors are provided.

13. The MEMS device of claim 12, wherein from 1 to 4 hinges and 1 to 2 hinges are provided.

14. The MEMS device of claim 1, wherein the movable micromechanical element is a micromirror for a projection display or optical switch.

15. The MEMS device of claim 1, wherein the movable micromechanical element is a MEMS switch.

16. The MEMS device of claim 1, wherein the connector is thinner than the hinge.

17. The MEMS device of claim 1, wherein the connector experiences lower maximum strain than the maximum strain of the hinge at maximum deflection.

18. The MEMS device of claim 1, wherein the connector is longer than the hinge.

19. The MEMS device of claim 1, wherein the connector has a circuitous shape and the hinge is substantially straight and elongated.

20. The MEMS device of claim 1, wherein the connector is a conductive multilayer laminate and the hinge is an insulator.

21. The MEMS device of claim 1, that is a micromirror.

22. The MEMS device of claim 21, that is a micromirror within a spatial light modulator.

23. A MEMS device comprising:
a substrate;
a movable micromechanical element held on the substrate such that the micromechanical element is movable relative to the substrate;
a connector and a hinge connecting the movable micromechanical element to the substrate for allowing movement of the micromechanical element, wherein the connector has an electrical conductivity greater than the hinge.

24. The MEMS device of claim 23, wherein a spring constant of the connector is different than a spring constant of the hinge.

25. The MEMS device of claim 24, wherein the hinge has a greater width and/or thickness than the connector.

26. The MEMS device of claim 25, wherein hinge comprises a ceramic material.

27. The MEMS device of claim 26, wherein the hinge comprises a nitride or oxide of silicon.

28. The MEMS device of claim 27, wherein the less stiff connector comprises an elemental metal, intermetallic compound, conductive ceramic or a metal alloy.

29. The MEMS device of claim 28, wherein the connector comprises aluminum, titanium, titanium tungsten, titanium aluminide, tungsten, copper, and alloys thereof.

30. The MEMS device of claim 24, wherein the difference in the spring constants of the connector and hinge is by at least a factor of one.

31. The MEMS device of claim 23, wherein the connector comprises a metal, intermetallic compound, conductive ceramic or metal alloy layer and the hinge comprises a ceramic compound layer.

32. The MEMS device of claim 31, wherein the connector is made of aluminum, titanium, titanium tungsten, titanium aluminide, tungsten, copper, and alloys thereof, and the hinge comprises a metal oxide, metalloid oxide, metalloid nitride or metal nitride.

33. The MEMS device of claim 32, wherein the hinge is a reactively sputtered metal in nitrogen or oxygen.

34. The MEMS device of claim 23, wherein a plurality of connectors and/or hinges are provided.

35. The MEMS device of claim 34, wherein from 1 to 4 hinges and 1 to 2 connectors are provided.

36. The MEMS device of claim 23, wherein the movable micromechanical element is a micromirror for a projection display or optical switch.

37. The MEMS device of claim 23, wherein the movable micromechanical element is a MEMS switch.

38. The MEMS device of claim 23, wherein the connector is thinner than the hinge.

39. The MEMS device of claim 23, wherein the connector experiences lower strain than the hinge at maximum deflection.

40. The MEMS device of claim 23, wherein the connector is longer than the hinge.

41. The MEMS device of claim 23, wherein the connector has a circuitous shape and the hinge is substantially straight.

42. The MEMS device of claim 23, wherein the connector is a conductive multilayer laminate and the hinge is an insulator.

43. The MEMS device of claim 23, that is a micromirror.

44. The MEMS device of claim 43, that is a micromirror within a spatial light modulator.

45. A MEMS device comprising:
a substrate;
a movable micromechanical element movable relative to the substrate;
a connector and a hinge held on the substrate by a plurality of posts and arranged for allowing movement of the micromechanical element, wherein the connector and hinge have different spring constants;
wherein the connector and hinge extend between the posts across the micromechanical element; and
wherein the connector and hinge are spaced apart from the micromechanical element with a gap formed therebetween.

46. The MEMS device of claim 45, further comprising circuitry and an electrode on the substrate or on a second substrate for electrostatically actuating the micromechanical element.

47. The MEMS device of claim 46, wherein from 1 to 4 hinges and 1 to 2 connectors are provided.

48. The MEMS device of claim 45, wherein the hinge is stiffer and insulating and the connector is less stiff and conducting.

49. The MEMS device of claim 48, wherein the hinge comprises a ceramic material.

50. The MEMS device of claim 49, wherein the stiffer insulating hinge comprises a nitride or oxide of silicon.

51. The MEMS device of claim 50, wherein the less stiff connector comprises an elemental metal or a metal alloy.

52. The MEMS device of claim 51, wherein the metal or metal alloy is selected from aluminum, titanium, titanium tungsten, titanium aluminide, tungsten, copper, and alloys thereof.

53. The MEMS device of claim 45, wherein the difference in the spring constants of the hinge and connector is by at least a factor of two.

54. The MEMS device of claim 45, wherein the connector comprises a metal or metal alloy layer and the hinge comprises a ceramic compound layer.

55. The MEMS device of claim 54, where the connector is made of aluminum, titanium, titanium tungsten, titanium aluminide, tungsten, copper, and alloys thereof, and the hinge comprises a metal oxide, metalloid oxide, metalloid nitride or metal nitride.

56. The MEMS device of claim 55, wherein the hinge is a reactively sputtered metal in nitrogen or oxygen.

57. The MEMS device of claim 45, wherein a plurality of connectors and/or hinges is provided.

58. The MEMS device of claim 45, wherein the movable micromechanical element is a micromirror for a projection display or optical switch.

59. The MEMS device of claim 45, wherein the movable micromechanical element is a MEMS switch.

60. The MEMS device of claim 45, wherein the connector is thinner than the hinge.

61. The MEMS device of claim 45, wherein the connector experiences lower strain than the hinge at maximum deflection.

62. The MEMS device of claim 45, wherein the connector is longer than the hinge.

63. The MEMS device of claim 45, wherein the connector has a circuitous shape and the hinge is substantially straight.

64. The MEMS device of claim 45, wherein the connector is a conductive multilayer laminate and the hinge is an insulator.

65. The MEMS device of claim 45, that is a micromirror.

66. A MEMS device comprising:
a substrate;
a movable micromechanical element movable relative to the substrate;
a connector and a hinge held on the substrate by a plurality of posts and arranged for allowing movement of the micromechanical element, wherein the connector experiences a lower strain at maximum deflection of the micromechanical element than the hinge;
wherein the connector and hinge extend between the posts across the micromechanical element; and
wherein the connector and hinge are spaced apart from the micromechanical element with a gap formed therebetween.

67. The MEMS device of claim 66, wherein a spring constant of the connector is different than a spring constant of the hinge.

68. The MEMS device of claim 67, wherein the hinge that is stiffer is insulating and the connector that is less stiff is conducting.

69. The MEMS device of claim 68, wherein the stiffer insulating hinge comprises a ceramic material.

70. The MEMS device of claim 69, wherein the stiffer insulating hinge comprises a nitride or oxide of silicon.

71. The MEMS device of claim 70, wherein the less stiff connector comprises an elemental metal, intermetallic compound, conductive ceramic or a metal alloy.

72. The MEMS device of claim 71, wherein the connector comprises aluminum, titanium, titanium tungsten, titanium aluminide, tungsten, copper, and alloys thereof.

73. The MEMS device of claim 67, wherein the difference in the spring constants of the hinges is by at least a factor of two.

74. The MEMS device of claim 66, wherein the connector comprises a metal or metal alloy layer and the hinge comprises a ceramic compound layer.

75. The MEMS device of claim 74, wherein the connector is made of aluminum, titanium, titanium tungsten, titanium aluminide, tungsten, copper, and alloys thereof, and the hinge comprises a metal oxide, metalloid oxide, metalloid nitride or metal nitride.

76. The MEMS device of claim 75, wherein the hinge is a reactively sputtered metal in nitrogen or oxygen.

77. The MEMS device of claim 66, wherein a plurality of hinges is provided.

78. The MEMS device of claim 77, that is a micromirror in a spatial light modulator.

79. The MEMS device of claim 66, wherein the movable micromechanical element is a micromirror for a projection display or optical switch.

80. The MEMS device of claim 66, wherein the movable micromechanical element is a MEMS switch.

81. The MEMS device of claim 66, wherein the connector is thinner than the hinge.

82. The MEMS device of claim 66, wherein the connector is made of a different material than the hinge.

83. The MEMS device of claim 66, wherein the connector is longer than the hinge.

84. The MEMS device of claim 66, wherein the connector has a circuitous shape and the hinge is substantially straight.

85. The MEMS device of claim 66, wherein the connector is a conductive multilayer laminate and the hinge is an insulator.

86. A MEMS device comprising:
a substrate;
a movable micromechanical element movable relative to the substrate;
a connector and a hinge for allowing movement of the micromechanical element, the hinge being an elongated hinge that connects to one or more posts on the substrate and to the movable micromechanical element, each hinge having a length in the direction of the elongation, and a width and depth; and
wherein at least one of the width and depth of the connector is different than the width or depth of the hinge.

87. The MEMS device of claim 86, wherein a spring constant of the connector is different than a spring constant of the hinge.

88. The MEMS device of claim 87, wherein the hinge that is stiffer has a greater width and/or thickness.

89. The MEMS device of claim 88, wherein the stiffer insulating hinge comprises a ceramic material.

90. The MEMS device of claim 89, wherein the stiffer insulating hinge comprises a nitride or oxide of silicon.

91. The MEMS device of claim 90, wherein the less stiff connector comprises an elemental metal, intermetallic compound, conductive ceramic or a metal alloy.

92. The MEMS device of claim 91, wherein the metal or metal alloy is selected from aluminum, titanium, titanium tungsten, titanium aluminide, tungsten, copper, and alloys thereof.

93. The MEMS device of claim 87, wherein the difference in the spring constants of the connector and hinge is by at least a factor of two.

94. The MEMS device of claim 86, wherein the connector comprises a metal or metal alloy layer and the hinge comprises a ceramic compound layer.

95. The MEMS device of claim 94, wherein the connector is made of aluminum, titanium, titanium tungsten, titanium aluminide, tungsten, copper, and alloys thereof, and the hinge comprises a metal oxide, metalloid oxide, metalloid nitride or metal nitride.

96. The MEMS device of claim 95, wherein the hinge is a reactively sputtered metal in nitrogen or oxygen.

97. A spatial light modulator comprising:
a substrate;
a post connected to the substrate;
a movable micromirror element connected to the post via a hinge such that the micromirror element is movable relative to the substrate; and
a connector separate from the hinge, wherein the hinge supplies at least 90% of the restoring force to the micromirror element and the connector supplies 10% or less of the restoring force.

98. The spatial light modulator of claim 97, wherein the hinge supplies at least 99% of the restoring force to the micromirror element and the connector supplies 1% or less of the restoring force.

* * * * *